United States Patent

Katsura

[11] Patent Number: 5,682,569
[45] Date of Patent: Oct. 28, 1997

[54] SHUTTER CHARGE DEVICE

[75] Inventor: Hirofumi Katsura, Kanagawa, Japan

[73] Assignee: Fuji Photo Film Co., Ltd., Kanagawa, Japan

[21] Appl. No.: 736,029

[22] Filed: Oct. 23, 1996

[30] Foreign Application Priority Data

Oct. 23, 1995 [JP] Japan .................................. 7-274113

[51] Int. Cl.$^6$ .................................................. G03B 17/42
[52] U.S. Cl. .................................................. 396/443
[58] Field of Search .............................. 396/443, 444, 396/401, 402, 6

[56] References Cited

U.S. PATENT DOCUMENTS 5,581,316  12/1996  Kamoda et al. .................. 396/401 X Primary Examiner—Howard B. Blankenship
Attorney, Agent, or Firm—Young & Thompson

[57] ABSTRACT

A shutter charge device is used with photo film and charges a shutter device. The photo film includes plural groups of perforations formed along one edge thereof. The groups are arranged at the predetermined pitch of the frames. Each of the groups includes two perforations disposed closely to one another at a predetermined distance. A driven sprocket wheel is meshed intermittently with the perforations in the photo film, and rotated by a predetermined amount while the photo film is wound as long as one of the frames. A rotatable member is rotated in integral fashion with the sprocket wheel by the predetermined amount, and charges the shutter device. A retainer lever is engaged with the rotatable member rotated by the predetermined amount, and locks the sprocket wheel to block movement of the photo film. The retainer lever is disengaged from the rotatable member upon releasing of the shutter device, and unlocks the sprocket wheel to allow it to rotate. A frame counter wheel is stepped one by one when the rotatable member is rotated by the predetermined amount, and indicates a number representing exposed ones of the frames. A disabling projection is operated by winding of the photo film after creating the frames of the predetermined number, and blocks rotation of the sprocket wheel upon disengagement of the sprocket wheel from the perforations, whereby no further exposure is taken on the photo film.

11 Claims, 5 Drawing Sheets

SHUTTER CHARGE DEVICE

BACKGROUND OF THE INVENTION

1. Field of the Invention

The present invention relates to a shutter charge device. More particularly, the present invention relates to a shutter charge device used with a photo film in which each of frames is associated with at least one perforation regularly.

2. Description Related to the Prior Art

There is a suggestion of photo film of a new type which is different from the 135 type used the most widely, includes new arrangement of perforations, and is adapted to heighten a process of photographic printing. In the photo film, the perforations are arranged at two intervals alternately. A frame is created by taking an exposure between two of the perforations arranged at a longer,one of the two intervals. The photo film includes a photo film effective region and non-exposure regions. Exposures are taken on the photo film effective region in a camera or a lens-fitted photo film unit, in which the non-exposure regions should be kept from being exposed. The non-exposure regions are disposed on a leading end and a trailing end of the photo film beside the photo film effective region, and used at the time of photo film processing. It is required to keep the non-exposure regions unexposed during the use in the camera or the lens-fitted photo film unit.

In the camera or the lens-fitted photo film unit of a low cost, a shutter charge device is used. The shutter charge device is driven by movement of the photo film being wound after taking each one frame, for charging a shutter device and stepping the indicated number of frames among all the available frames. The photo film of the new type also includes a pair of perforations on a beginning edge of a frame as an edge closer to a leader, in view of adaptation to the camera in which exposures are taken in an order from the leader to a trailer of the photo film.

In the camera and the lens-fitted photo film unit of a pre-winding type, the two perforations on the side of the leader are disposed at a frame being finally exposed. After exposures on the photo film effective region are terminated, the shutter device is charged again. The camera and the lens-fitted photo film unit are operated to wind the non-exposure region on the side of the leader of the photo film entirely into a cassette shell. The shutter device is not operated any more in a normal state. If there occurs shock or vibration to the camera or the lens-fitted photo film unit, the shutter device may be released. A problem lies in taking an unwanted exposure upon releasing the shutter device while the photo film is finally wound.

SUMMARY OF THE INVENTION

In view of the foregoing problems, an object of the present invention is to provide a shutter charge device in which a non-exposure region of photo film can be reliably maintained unexposed.

In order to achieve the above and other objects and advantages of this invention, a driven sprocket wheel is meshed intermittently with the perforations in the photo film, and rotated by a predetermined amount while the photo film is wound as long as one of the frames. A rotatable member is rotated in integral fashion with the sprocket wheel by the predetermined amount, for charging the shutter device. A retainer mechanism is engaged with the rotatable member being rotated by the predetermined amount, for locking the sprocket wheel to block movement of the photo film. The retainer mechanism is disengaged from the rotatable member upon releasing of the shutter device, for unlocking the sprocket wheel to allow the sprocket wheel to rotate. A frame counter wheel is stepped one by one when the rotatable member is rotated by the predetermined amount, for indicating a number representing exposed ones of the frames. A disabling mechanism is operated by winding of the photo film after creating the frames of the predetermined number, for blocking rotation of the sprocket wheel upon disengagement of the sprocket wheel from the perforations, whereby the photo film is prevented from being further exposed.

In a preferred embodiment, the retainer mechanism is engaged with the rotatable member when one of the groups of the perforations is engaged with the sprocket wheel.

The disabling mechanism is contacted on the frame counter wheel in response to winding of the photo film after creating the frames of the predetermined number, for blocking rotation of the frame counter wheel, whereby the sprocket wheel is locked.

There is a first projection disposed to project from the frame counter wheel. The disabling mechanism includes a second projection disposed to project from the retainer mechanism, contacted on the first projection of the frame counter wheel rotated by winding of the photo film, for stopping the frame counter wheel from rotating.

In the present invention, a non-exposure region of photo film can be reliably maintained unexposed.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
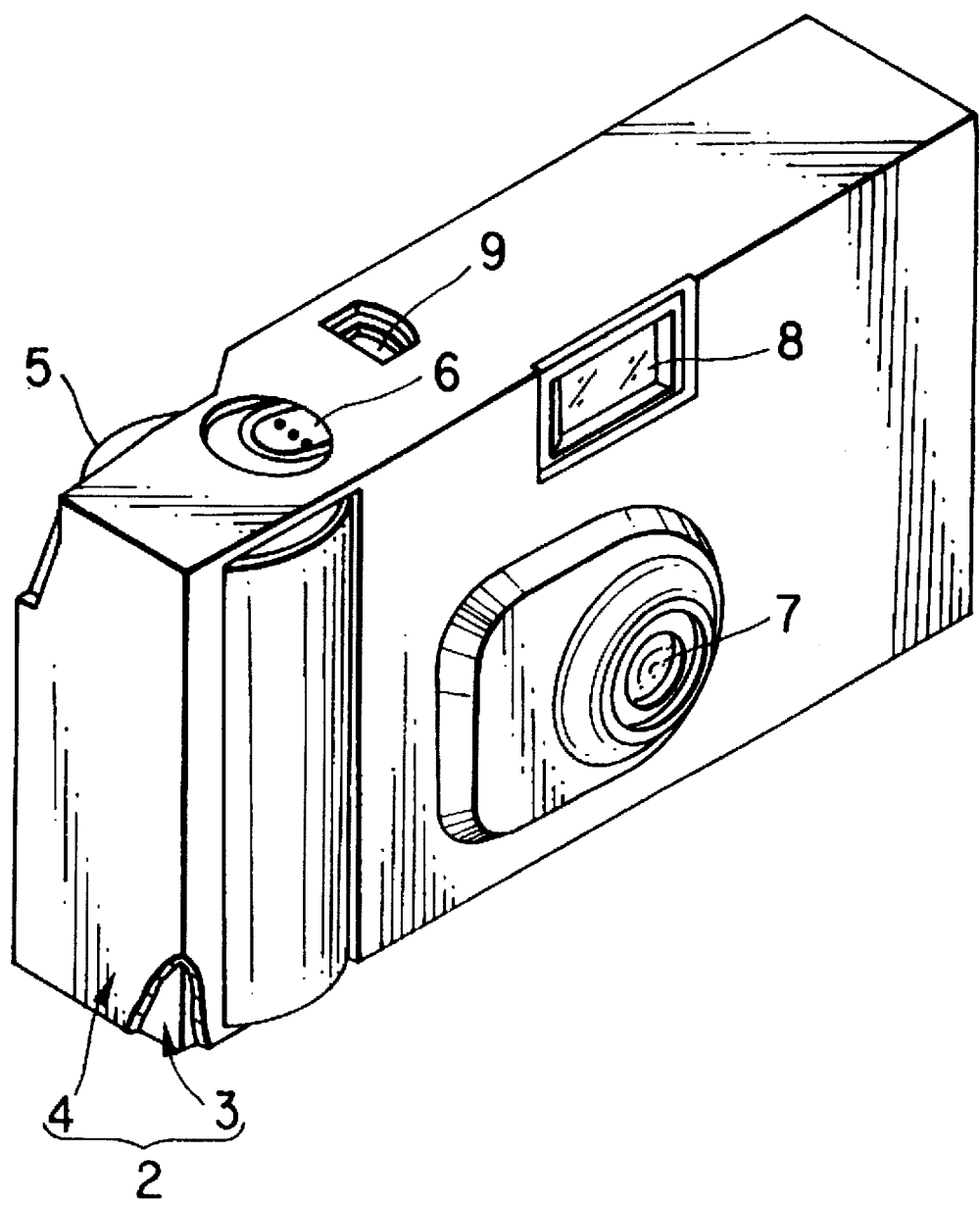
FIG. 1 is a perspective illustrating a lens-fitted photo film unit.

A shutter charge device of the present invention is described hereinafter as an embodiment used in a lens-fitted photo film unit 2. In FIG. 1, the lens-fitted photo film unit 2 is generally constituted by a photo film housing 3 and a cardboard packaging 4. The cardboard packaging 4 has openings through which there appear a winding wheel 5, a shutter release button 6, a taking lens 7, a viewfinder window 8, and an indicator window 9 for a frame counter.

Figure 2:
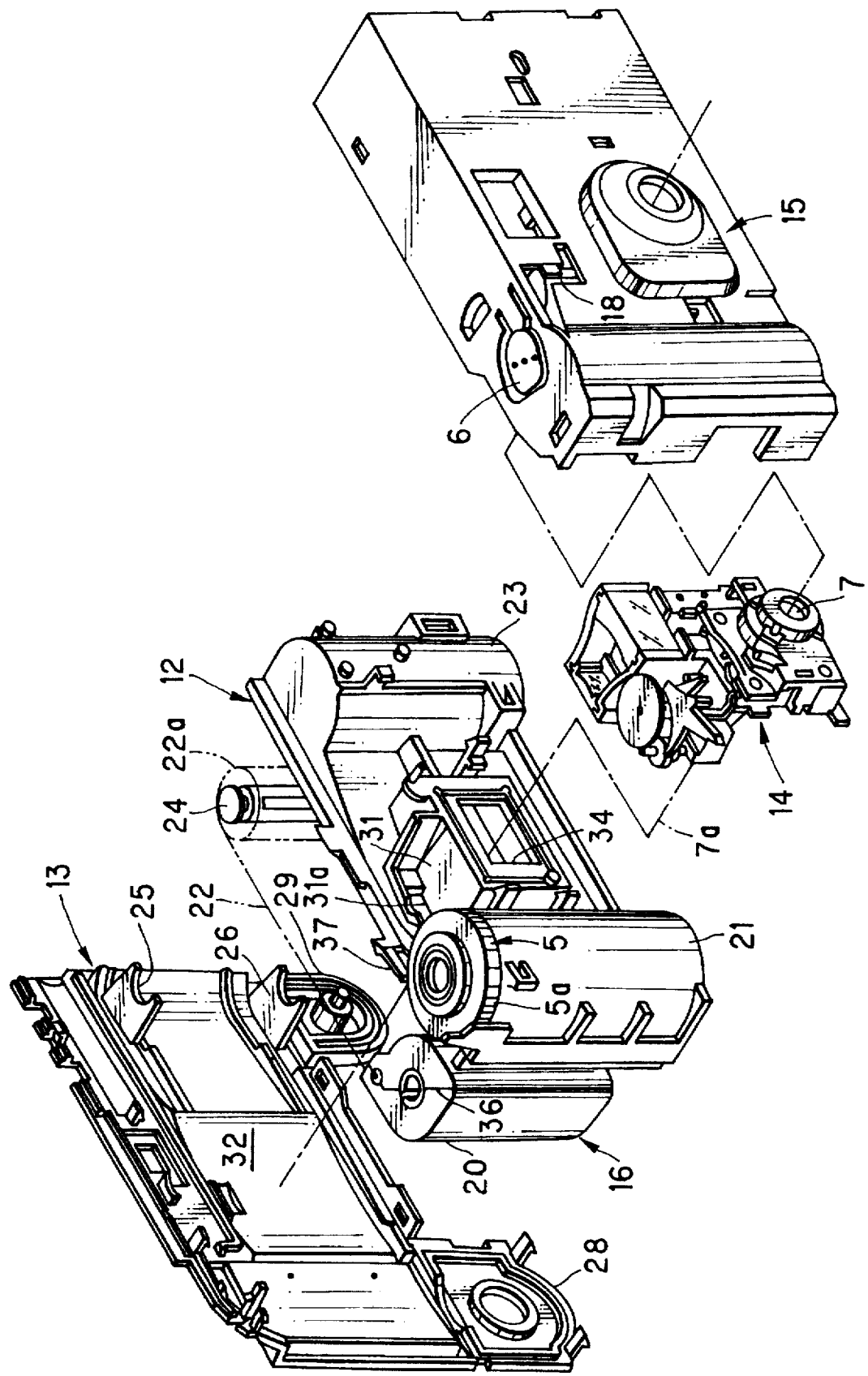
FIG. 2 is an exploded perspective illustrating a photo film housing of the lens-fitted photo film unit.

As illustrated in FIG. 2, the photo film housing 3 consists of a photo film containing section 12, a rear cover 13, a photograph-taking section 14 and a front cover 15. In front of the photo film containing section 12, the photo-taking section 14 is secured in removable fashion. The photo-taking section 14 includes the taking lens 7 for focussing of an object, a shutter blade, a one-frame winding mechanism, and the shutter charging device and other elements. The photo-taking section 14 is constructed as a unit. The rear cover 13 is secured to the rear of the photo film containing section 12 in a removable fashion. A photo film cassette 16 with a cassette is contained between the rear cover 13 and the photo film containing section 12 in light-tight fashion.

The front cover 15 is secured to the front of the photo film containing section 12 in removable fashion. The shutter release button 6 is formed with the front cover 15 by forming slits in the top of the front cover 15. Under the shutter release button 6 is formed a pressing rod 18, which presses a retainer lever 49 to actuate the shutter blade, to be described later in detail.

In the photo film containing section 12, there are formed a cassette containing chamber 21 and a photo film roll chamber 23. The cassette containing chamber 21 contains a cassette shell 20. The roll chamber 23 contains a roll 22a of unexposed photo film 22 as drawn fully from the cassette shell 20. The cassette shell 20 is formed from plastic. When the cassette shell 20 is unused, the photo film 22 is entirely contained therein. To use the cassette shell 20, a spool 36 is rotated to advance the photo film 22. In the present embodiment, the roll 22a is formed while wound about a supply spool 24. The supply spool 24 is rotatably supported by two forks 25 and 26, which are formed on the rear cover 13, and contacted on upper and lower ends of the supply spool 24 to support the supply spool 24 within the roll 22a.

It is to be noted that the supply spool 24 can be eliminated while the roll 22a is directly contained in the roll chamber 23. It is possible to eliminate the fork 25 at the same time.

Bottoms of the cassette containing chamber 21 and the roll chamber 23 are open, and are closed by bottom lids 28 and 29 after the loading of the photo film cassette 16. The bottom lids 28 and 29 have a pull-top structure formed with the rear cover 13.

Between the cassette containing chamber 21 and the roll chamber 23 is located a light-shielding tunnel 31. Behind the light-shielding tunnel 31 is formed an exposure aperture, which has a curved surface defined about an optical axis 7a passed through the taking lens 7, and adapted to contact with the photo film. On the rear cover 13 is formed a photo film support face 32 confronting a back face of the photo film. The support face 32 is curved as well as the surface of the light-shielding tunnel 31 and the photo film.

It is also possible to form a light-shielding tunnel with the photo-taking section 14. It is possible to separate the light-shielding tunnel 31 into two parts, one of which may be disposed on the photo-taking section 14 and the other of which may be disposed on the photo film containing section 12. Namely the light-shielding tunnel 31 is formed only after the photo-taking section 14 is fitted on the photo film containing section 12.

In front of the light-shielding tunnel 31, there is formed an opening 34 for introducing object light from the taking lens 7 to the exposure aperture. There is formed an opening 31a for containing a sprocket wheel while causing the same to emerge partially toward the photo film 22. The opening 31a is located higher than the exposure aperture and near to the cassette shell 20.

The winding wheel 5 is disposed on the top of the cassette containing chamber 21 in rotatable fashion, and engaged with a spool 36 of the cassette shell 20. The winding wheel 5 partially emerges externally through an opening of the rear cover 13. The external portion of the winding wheel 5 is rotated in a counterclockwise direction to wind the photo film. The spool 36 is rotated in the winding direction to include the photo film 22 as exposed into the cassette shell 20.

Around the winding wheel 5 are formed teeth 5a. A regulating claw 37 is formed on the photo film containing section 12, and engaged with the teeth 5a. The regulating claw 37 keeps the winding wheel 5 from rotating in a clockwise direction, which is reverse to the film winding.

Figure 3:
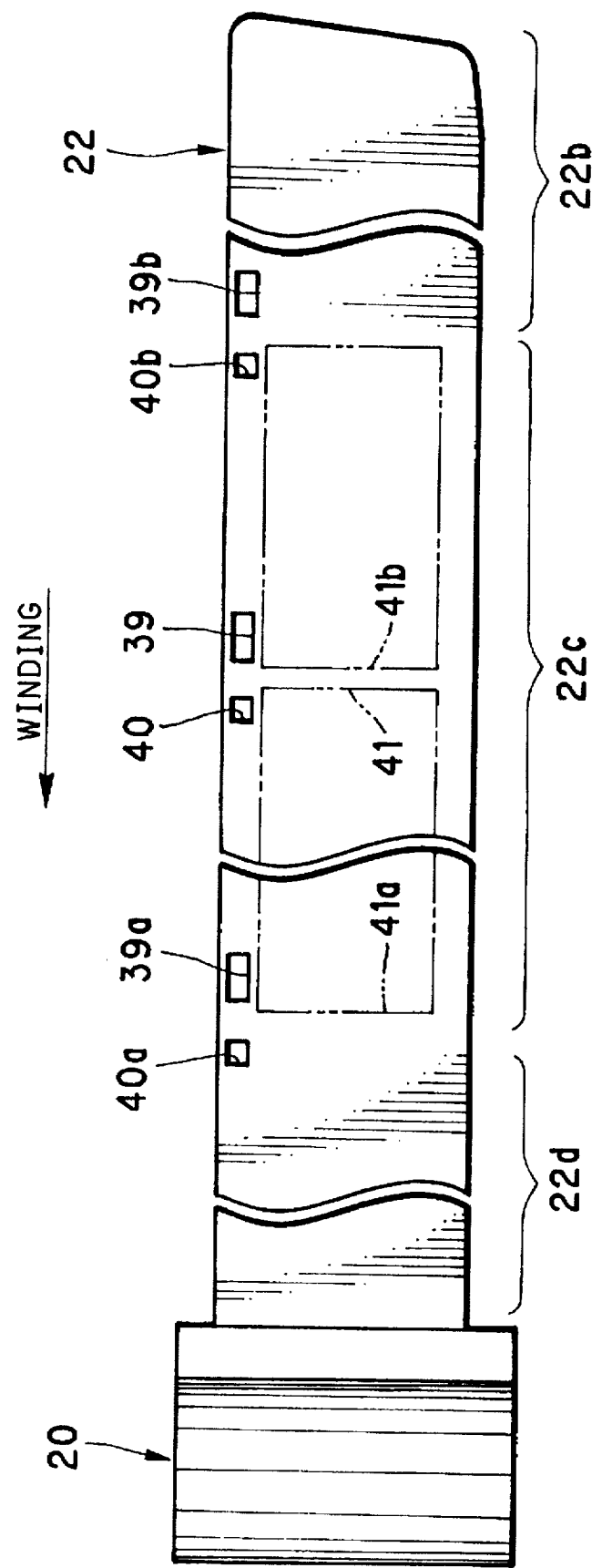
FIG. 3 is a plan illustrating a photo film cassette with photo film.

The photo film 22 includes a leader 22b, a photo film effective region 22c and a trailer 22d as illustrated in FIG. 3. Greater perforations 39 and smaller perforations 40 are formed in the photo film 22 along one edge of the photo film effective region 22c, and arranged at two intervals which are alternately repeated. The center of a longer one of the intervals between one greater and one smaller perforations 39 and 40 is located directly above the optical axis 7a, to set one of frames 41 to be exposed. The photo film effective region 22c has a length enough to form the frames 41 in the predetermined number of exposures, including a first frame 41a and a final frame 41b.

The trailer 22d is retained on the spool 36 of the cassette shell 20, and wound about the spool 36 when the winding wheel 5 is rotated. The leader 22b and the trailer 22d are determined as non-exposure regions used for the photo film processing. The leader 22b and the trailer 22d remain unused when wound into the cassette shell 20 after taking exposures.

It is also to be noted that the photo film is formed by treating the known photo film. To be precise, the known photo film, produced in a first line, is conveyed through a second line. The known photo film is punched at every one of two perforations included in each pair, to enlarge the one perforation, thereby to obtain the novel photo film. A difference between the photo film 22 and a photo film sold separately lies in the size of the perforations 39, which are located close to a respective side of the frames 41 nearer to the cassette shell 20. In the separately sold photo film, the perforations 39 are as great as the perforation 40. In the photo film 22, the greater perforations 39 are formed enlarged in a direction away from the cassette shell 20. The lens-fitted photo film unit includes greater sprocket teeth, which are not consistent to the separately sold photo film.

There is also a smaller perforation 40a next to the first frame 41a on the side of the trailer 22d. This is because a driven sprocket wheel 54 (See FIGS. 4 and 5) is rotated by adjacent two of the perforations arranged at a shorter one of the intervals. A greater perforation 39a at the first frame 41a must be associated with the smaller perforation 40a to constitute a pair.

There is also a greater perforation 39b next to the final frame 41b on the side of the leader 22b. A smaller perforation 40b at the final frame 41b must be associated with the greater perforation 39b to constitute a pair. If in the separately sold photo film for a camera, there would be a perforation being smaller and having a position of the greater perforation 39b.

Figure 4:
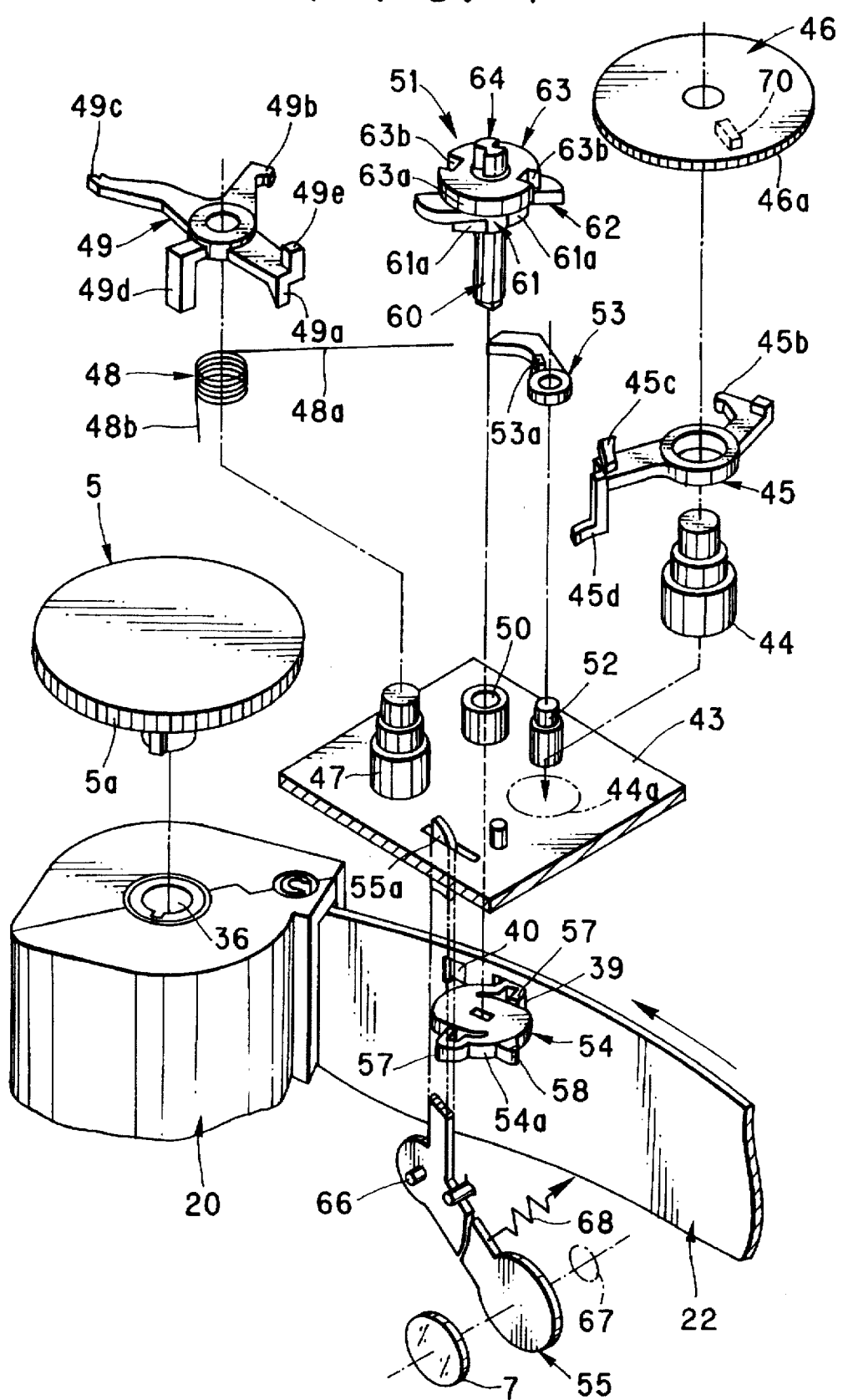
FIG. 4 is an exploded perspective illustrating a shutter charge device.
Figure 5:
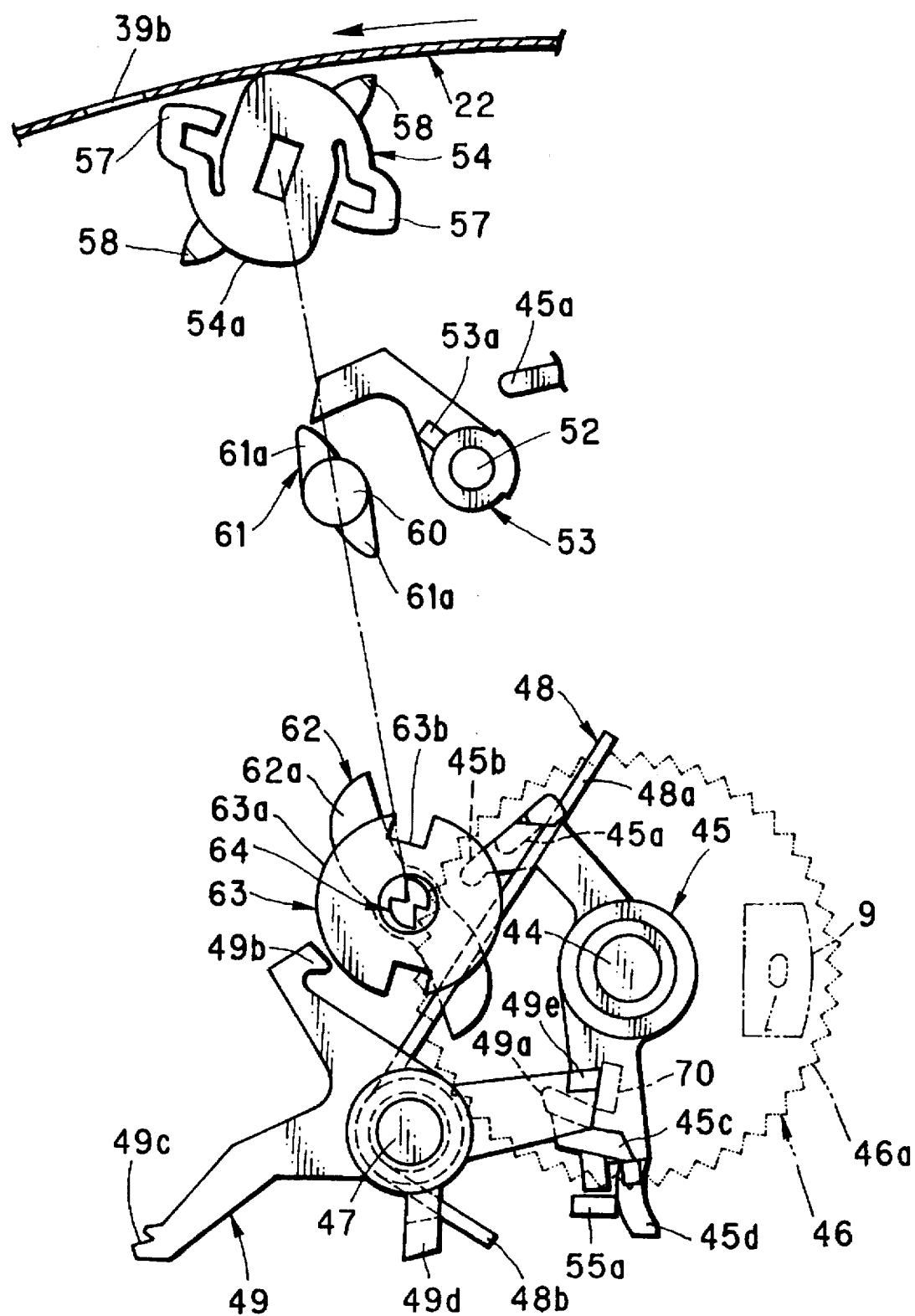
FIG. 5 is an explanatory view in plan, illustrating a state of the shutter charge device after taking a predetermined number of exposures.

The photo-taking section 14 includes the shutter charge device and other mechanisms. In FIGS. 4 and 5, the shutter charge device is constituted by a shutter drive lever 45, a frame counter wheel 46, a torsion coil spring 48, the retainer lever 49, a rotatable member 51, a pressing lever 53, the sprocket wheel 54, and a shutter blade 55. There are two shafts 44 and 47 and a bearing hole 50 formed with an upper face of a base portion 43 of the light-shielding tunnel 31. The shaft 44 receives the shutter drive lever 45 and the counter wheel 46 in insertion. The shaft 47 receives the torsion coil spring 48 and the retainer lever 49 in insertion. The rotatable member 51 is inserted in the bearing hole 50. Also the pressing lever 53 is received on a shaft 52. Note that the shaft 44 is disposed in a position of a phantom line 44a.

The sprocket wheel 54, emerging through the opening 31a, is secured to a bottom of the rotatable member 51. The sprocket wheel 54 has four teeth including two greater teeth 57 and two smaller teeth 58. The two greater teeth 57 are disposed in rotational symmetry at an angle of 180 degrees about a circular peripheral face 54a. The two smaller teeth 58 are disposed in rotational symmetry about the peripheral face 54a. The sprocket wheel 54 is caused to make half a rotation by the photo film 22 as moved toward the cassette shell 20 by one frame.

The greater teeth 57 are respectively engageable only with the greater perforations 39 and not with the smaller perforations 40. The smaller teeth 58 have a size engageable with the smaller perforations 40. If the separately sold photo film, having only the perforations being smaller, is inserted into a lens-fitted photo film unit, the greater teeth 57 cannot be meshed with the perforations. It is possible to prevent users or photofinishers from reloading lens-fitted photo film units manually with unexposed photo film.

The inside of the greater teeth 57 has a cutout, which renders the greater teeth 57 resilient and movable toward the center of the sprocket wheel 54. A user or photo finisher may wish to reduce the size of the greater teeth 57 by scraping or partially cutting for the purpose of reuse of the sprocket wheel 54 by loading new photo film. The greater teeth 57 are so resilient that no damage of the photo film 22 occurs if one of the greater perforations 39 has not come properly to one of the greater teeth 57. No failure due to the sprocket wheel 54 occurs in winding the photo film 22.

The rotatable member 51 includes a shaft 60, a cylinder portion 61, a shutter charge cam 62, a stopper cam portion 63, a two-toothed gear 64, which are formed integrally. The shaft 60 is inserted in the bearing hole 50. The cylinder portion 61 operates to rotate the sprocket wheel 54 forcibly. The shutter charge cam 62 is adapted for the shutter charging. The stopper cam portion 63 stops the photo film to set a frame. The two-toothed gear 64 causes the frame counter wheel 46 to rotate by one step.

The cylinder portion 61 has two projections 61a disposed in rotational symmetry about its axis. There are photo film portions defined as longer intervals between perforations. There occurs regular disengagement of the teeth 57 and 58 from any of the perforations 39 and 40 in the course of the photo film feeding. To rotate the sprocket wheel 54 forcibly during this disengagement, the pressing lever 53 being biased presses the projections 61a rotationally for continuation of the rotation of the sprocket wheel 54. The pressing lever 53 operates to rotate one of the smaller teeth 58 to a standby position for mesh with a succeeding one of the smaller perforations 40.

A top of the pressing lever 53 has a ridge 53a. When the ridge 53a is pressed by a pressing projection 45a under the shutter drive lever 45, the pressing lever 53 presses one of the projections 61a while rotating about the shaft 52 counterclockwise. A distal end 48a is engaged with the shutter drive lever 45, which is biased by the torsion coil spring 48 counterclockwise in a release direction. After the shutter releasing, the pressing projection 45a presses the ridge 53a. In the course of the clockwise rotation of the shutter drive lever 45, the spring bias to the ridge 53a via the pressing projection 45a decreases gradually.

The charge cam 62 has two cam portions 62a disposed in rotational symmetry at an angle of 180 degrees. The shutter drive lever 45 has a claw 45b, which is located in a rotational orbit of the cam portions 62a. While the sprocket wheel 54 makes half a rotation, one of the cam portions 62a causes the shutter drive lever 45 to rotate clockwise in a charge direction against the bias of the torsion coil spring 48. A rise portion 45c of the shutter drive lever 45 is engaged with a bottom ridge 49a of the retainer lever 49, and is retained in a charge position.

Another distal end 48b of the torsion coil spring 48 is engaged with a receiving portion of the retainer lever 49, and biases the retainer lever 49 clockwise in a charge direction and toward a stop position. A claw 49b is contacted on a face 63a about the stopper cam portion 63. Two grooves 63b are formed in the stopper cam portion 63 and disposed in rotational symmetry thereabout. Upon the half rotation of the rotatable member 51, the claw 49b of the retainer lever 49 is received in one of the grooves 63b as the torsion coil spring 48 rotates the retainer lever 49 slightly, to block rotation of the sprocket wheel 54. The retainer lever 49 now has the stop position where the retainer lever 49 stops the photo film from being wound. A stop claw 49c is engaged with the teeth 5a of the winding wheel 5, to hinder the photo film from being wound.

When the rotatable member 51 makes half a rotation, the two-toothed gear 64 rotates in the same manner. The two-toothed gear 64 is meshed with teeth 46a about the frame counter wheel 46. The half rotation of the two-toothed gear 64 causes the frame counter wheel 46 to rotate clockwise by one step. A top face of the frame counter wheel 46 has a series of numbers arranged rotationally by a pitch angle. Each of the numbers is observable through the indicator window 9. The numbers are arranged decteasingly to indicate the number of the remaining frames to be exposed.

When the release button 6 is depressed, the pressing rod 18 presses a receiving portion 49d of the retainer lever 49 to rotate the retainer lever 49 counterclockwise in a release direction. The rise portion 45c of the shutter drive lever 45 is disengaged from the bottom ridge 49a of the retainer lever 49, so that the shutter drive lever 45 is rotated counterclockwise by the bias of the torsion coil spring 48. An arm 55a, which is formed on the shutter blade 55 and projects above the base portion 43, is struck by a striking arm 45d. The shutter blade 55 is swung about a shaft 66, to open a shutter opening 67. An exposure is taken on the photo film 22. Then the shutter blade 55 is rotated counterclockwise by the bias of a tension spring 68. The shutter opening 67 is closed quickly.

When the retainer lever 49 is rotated counterclockwise, the stop claw 49c is moved away from the teeth 5a. The claw 49b is moved away from the grooves 63b. The winding wheel 5 becomes rotatable. Then the winding wheel 5 is manually rotated counterclockwise in the winding direction. The photo film 22 is wound into the cassette shell 20 at an amount of one frame. The rotatable member 51 makes half a rotation, so as to charge the shutter, step down the frame counter wheel 46 by one, and retain the photo film in the frame set position.

In the course of taking exposures by use of the above-constructed shutter charge device, the shutter charging and shutter releasing are repeated. When the exposure to the final frame 41b is taken, the remaining portion of the photo film 22, including the final frame 41b and the leader 22b, is wound into the cassette shell 20 by rotating the winding wheel 5. The photo film 22 is fed. The perforations 39b and 40b in the photo film 22 cause the sprocket wheel 54 to rotate. Before half a rotation of the sprocket wheel 54, one of the greater teeth 57 is disengaged from the greater perforation 39b. The sprocket wheel 54 comes to have an orientation in which none of the teeth 57 and 58 projects through the opening 31a in the light-shielding tunnel 31.

A bottom of the frame counter wheel 46 has a projection 70. When the frame counter wheel 46 is rotated after exposure to the final frame 41b, the projection 70 is contacted on a disabling projection 49e of the retainer lever 49 upon disengagement of the greater teeth 57 from the greater perforation 39b.

When the projection 70 of the frame counter wheel 46 is contacted on the retainer lever 49, the frame counter wheel 46 is stopped from rotating further. A number "0" (zero) is indicated in the indicator window 9. Also the rotatable member 51, of which the two-toothed gear 64 is meshed with the frame counter wheel 46, is stopped. Accordingly the sprocket wheel 54 is kept from rotating, while the greater teeth 57 or the smaller teeth 58 do not protrude through the opening 31a.

Even when the photo film 22 is further wound, the sprocket wheel 54 is not rotated. There is no retention of the photo film 22 in the frame set position. The photo film 22 is smoothly wound into the cassette shell 20. There is no charging of the shutter. No exposure is taken on the leader 22b.

The above shutter charge device is incorporated in the lens-fitted photo film unit. The present invention is also applicable to a camera. In the above embodiment, the frame counter wheel is stopped from rotating for stopping the sprocket wheel. Alternatively an element different from the frame counter wheel may be retained for the purpose of stopping the sprocket wheel.

On the frame counter wheel 46, the numbers are arranged decreasingly to indicate the number of the remaining frames to be exposed. The present invention is also applicable to a device having a frame counter wheel on which the numbers are arranged increasingly to indicate the number of the exposed ones of the frames.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A shutter charge device for charging a shutter device in response to movement of photo film, said photo film being provided with a predetermined number of frames created at a predetermined pitch, said photo film including plural groups of perforations formed along one edge thereof, said groups being arranged at said predetermined pitch of said frames, each of said groups including first and second perforations disposed closely to one another at a predetermined distance, said shutter charge device comprising:

a driven sprocket wheel meshed intermittently with said perforations in said photo film, and rotated by a predetermined amount while said photo film is wound as long as one of said frames;

a rotatable member, rotated in integral fashion with said sprocket wheel by said predetermined amount, for charging said shutter device;

a retainer mechanism engaged with said rotatable member being rotated by said predetermined amount, for locking said sprocket wheel to block movement of said photo film, said retainer mechanism being disengaged from said rotatable member upon releasing of said shutter device, for unlocking said sprocket wheel to allow said sprocket wheel to rotate;

a frame counter wheel, stepped one by one when said rotatable member is rotated by said predetermined amount, for indicating a number representing exposed ones of said frames; and a disabling mechanism, operated by winding of said photo film after creating said frames of said predetermined number, for blocking rotation of said sprocket wheel upon disengagement of said sprocket wheel from said perforations, whereby said photo film is prevented from being further exposed.

2. A shutter charge device as defined in claim 1, wherein said retainer mechanism is engaged with said rotatable member when one of said groups of said perforations is engaged with said sprocket wheel.

3. A shutter charge device as defined in claim 2, wherein said disabling mechanism is contacted on said frame counter wheel in response to winding of said photo film after creating said frames of said predetermined number, for blocking rotation of said frame counter wheel, whereby said sprocket wheel is locked.

4. A shutter charge device as defined in claim 3, wherein there is a first projection disposed to project from said frame counter wheel; and said disabling mechanism includes a second projection disposed to project from said retainer mechanism, contacted on said first projection of said frame counter wheel rotated by winding of said photo film, for stopping said frame counter wheel from rotating.

5. A shutter charge device as defined in claim 4, wherein said first projection is disposed to extend in a radial direction of said frame counter wheel.

6. A shutter charge device as defined in claim 4, wherein said sprocket wheel including at least one pair of teeth, each of said at least one pair including first and second teeth arranged at an interval corresponding to said predetermined distance, said first tooth being meshed with said first perforation, then said second tooth being meshed with said second perforation, said retainer mechanism locking said sprocket wheel while said second tooth is meshed with said second perforation.

7. A shutter charge device as defined in claim 6, wherein said at least one pair of said teeth comprise first and second pairs, said pairs arranged in rotationally symmetrical fashion pair to pair.

8. A shutter charge device as defined in claim 7, wherein said second perforation is greater than said first perforation, and said second tooth is greater than said first tooth.

9. A shutter charge device as defined in claim 8, wherein said sprocket wheel includes a cutout formed through said second tooth, for rendering said second tooth movable inwards therein with resiliency.

10. A shutter charge device as defined in claim 9, further comprising a biasing mechanism for rotating said sprocket wheel further by a regular amount when said second tooth is moved out of said second perforation after rotating of said sprocket wheel in accordance with movement of said photo film during said sprocket wheel is unlocked, wherein said first tooth is contacted on said photo film upon rotation of said sprocket wheel by said regular amount, and stands by for meshing with another group of said groups of said perforations, and said photo film is moved in contact with said first tooth while said first tooth stands by.

11. A shutter charge device as defined in claim 10, further comprising:

a shutter drive lever disposed in rotatable fashion, rotated in a charge direction by said rotatable member when said sprocket wheel is rotated, biased by said biasing mechanism in a release direction opposite to said charge direction, and rotated in said release direction to drive said shutter device;

a pressing lever disposed beside said shutter drive lever in swingable fashion, located in a rotational orbit of said shutter drive lever at least partially, and pressed by said shutter drive lever rotated in said release direction; and a third projection disposed to project radially from said rotatable member, and located in a rotational orbit of said pressing lever when said second tooth of said first pair is disengaged from said second perforation during rotation of said sprocket wheel, wherein said biasing mechanism swings said pressing lever in said release direction of said shutter drive lever via said shutter drive lever, said third projection being pressed and rotated by said pressing lever, and said sprocket wheel is rotated before said first tooth of said second pair is engaged with said first perforation of said other group.

* * * * *